US009680934B2

(12) United States Patent
Liu et al.

(10) Patent No.: US 9,680,934 B2
(45) Date of Patent: Jun. 13, 2017

(54) VEHICLE COMMUNICATION CHANNEL MANAGEMENT

(71) Applicant: FORD GLOBAL TECHNOLOGIES, LLC, Dearborn, MI (US)

(72) Inventors: Yimin Liu, Ann Arbor, MI (US); Perry Robinson MacNeille, Lathrup Village, MI (US); Thomas Schneider, Northville, MI (US); Alfredo Cateriano, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 599 days.

(21) Appl. No.: 13/944,431

(22) Filed: Jul. 17, 2013

(65) Prior Publication Data

US 2015/0023256 A1   Jan. 22, 2015

(51) Int. Cl.
| | |
|---|---|
| *H04W 72/06* | (2009.01) |
| *H04L 29/08* | (2006.01) |
| *H04L 12/58* | (2006.01) |
| *H04W 72/04* | (2009.01) |
| *H04W 4/04* | (2009.01) |

(52) U.S. Cl.
CPC .............. *H04L 67/12* (2013.01); *H04L 51/38* (2013.01); *H04W 4/046* (2013.01); *H04W 72/0493* (2013.01); *H04L 12/58* (2013.01)

(58) Field of Classification Search
CPC ........ H04W 72/06; H04L 67/12; H04L 51/38; H04L 12/5895

USPC ........ 370/466, 569.2, 550.1, 41.1–41.3, 563, 370/329

See application file for complete search history.

(56) References Cited

U.S. PATENT DOCUMENTS

| 8,180,904 | B1 * | 5/2012 | Albanese | ............ H04L 12/5692 709/228 |
|---|---|---|---|---|
| 8,213,371 | B1 * | 7/2012 | Prock et al. | ............ H04W 8/02 370/329 |
| 2002/0145986 | A1 * | 10/2002 | Eteminan | ................ H04L 12/66 370/329 |
| 2003/0142645 | A1 * | 7/2003 | Belcea | .................. H04W 40/08 370/330 |
| 2006/0030298 | A1 * | 2/2006 | Burton | .................... H04L 51/38 455/412.1 |
| 2009/0203403 | A1 * | 8/2009 | Gidron | ................ H04L 12/5895 455/557 |
| 2009/0299857 | A1 | 12/2009 | Brubaker | |
| 2010/0293033 | A1 | 11/2010 | Hall et al. | |
| 2012/0054028 | A1 | 3/2012 | Tengler et al. | |
| 2012/0231821 | A1 | 9/2012 | Swanson | |
| 2012/0239471 | A1 | 9/2012 | Grimm et al. | |

(Continued)

*Primary Examiner* — Jae Y Lee
*Assistant Examiner* — Jean F Voltaire
(74) *Attorney, Agent, or Firm* — Jennifer M. Stec; Brooks Kushman P.C.

(57) ABSTRACT

A communication policy server may receive channel availability information indicative of a plurality of communication channels detected by a communication manager of a vehicle, each of the plurality of communication channels configured to provide messages to a target recipient associated with the vehicle. The communication policy server may recommend one of the plurality of detected communication channels as optimal based on factors such as preferences of the target recipient and preferences of the message source, the timing of the messages and the content of the messages.

22 Claims, 3 Drawing Sheets

(56) References Cited

U.S. PATENT DOCUMENTS

2012/0268294 A1   10/2012   Michaelis et al.
2012/0323690 A1   12/2012   Michael

* cited by examiner

US 9,680,934 B2

VEHICLE COMMUNICATION CHANNEL MANAGEMENT

BACKGROUND

Mechanisms or modes of travel over which two or more parties may communicate may be referred to as communication channels. Exemplary communication channels may include television, text messaging, mobile telephones, social media websites, and even billboards, as some examples. A message source may provide a message to one or more recipient parties through one or more communication channels. In some cases, the message may be provided from a company to a consumer or from the consumer to the company, while in other cases, communication may be between individuals, such as friends.

Management of communication channels may be difficult for senders and recipients of messages. For example, it may be difficult for senders to determine what communication channel to use to reach a particular recipient and when to reach the recipient, and it may be difficult for recipients to be responsive to senders across the different channels to which they have access. Moreover, marketers or other senders of messages may attempt to reach consumers without knowing the preferred communication channels of the consumers, and it may be difficult for the message sources to efficiently evaluate the performance of the marketing messages sent through various communication channels once sent.

SUMMARY

A method may include receiving, by a communication policy server, channel availability information indicative of a plurality of communication channels detected by a communication manager of a vehicle, each of the plurality of communication channels configured to provide messages to a target recipient associated with the vehicle; and recommending, by the communication policy server, one of the plurality of detected communication channels as optimal based on preferences of the target recipient and message source.

A communication policy server may store a policy server application, the application being executable by a processor of the communication policy server to provide operations comprising: receiving channel availability information indicative of a plurality of communication channels detected by a communication manager of a vehicle, each of the plurality of communication channels configured to provide messages to a target recipient associated with the vehicle; and recommending one of the plurality of detected communication channels as optimal based on preferences of the target recipient and message source.

A non-transitory computer-readable medium may store a policy server application software program, the policy server application being executable by a processor to provide operations comprising: receiving channel availability information indicative of a plurality of communication channels detected by a communication manager of a vehicle, each of the plurality of communication channels configured to provide messages to a target recipient associated with the vehicle; and recommending one of the plurality of detected communication channels as optimal based on preferences of the target recipient and message source.

DETAILED DESCRIPTION

Figure 1:
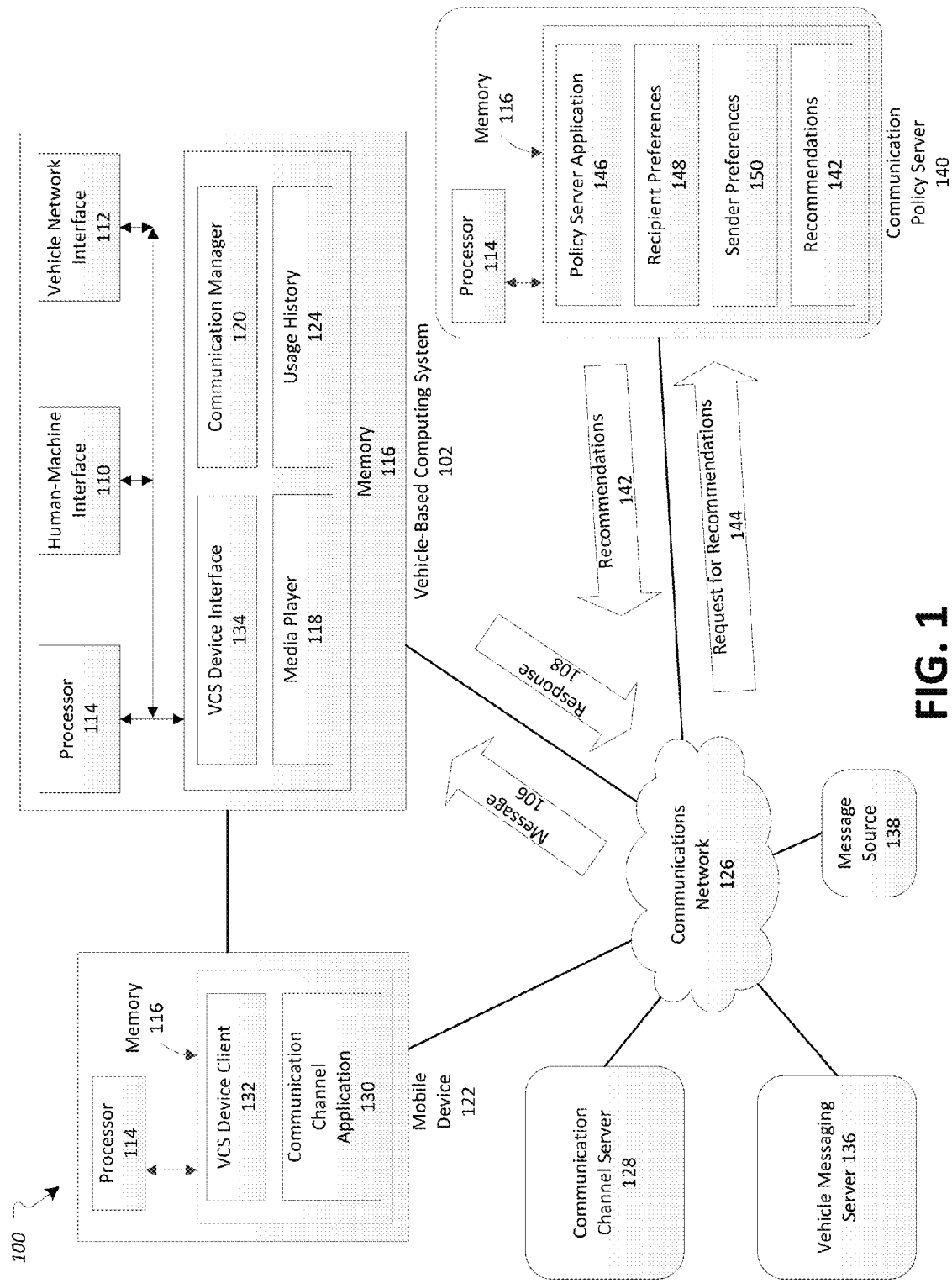
FIG. 1 illustrates an exemplary system for providing communication channel recommendations.

A system may include a communication manager embedded in a vehicle-based computing system (VCS) of a vehicle. The communication manager may be configured to detect one or more communication channels of the vehicle, and to provide vehicle communication information such as usage history and communication channel availability to a communication policy server. The communication manager may further facilitate the use of the vehicle itself as a channel of communication to the message recipient, apart from the other managed communication channels. The communication policy server may be configured to receive the vehicle communication information, and recommend communication channels from the set of detected channels as optimal for providing a message to the message recipient. In some cases, the message to be provided to the user may be a commercial marketing message, while in other cases, the message to be provided may be a personal communication between the message recipient and his or her contacts. In cases of a message having multiple recipients, the communication policy server may be configured to collectively determine a set of recommended communication channels for the plurality of message recipients.

The message recipients may have policies and preferences as they relate to communications over the various communication channels. For example, some message recipients may prefer not to be messaged during certain time periods (e.g., after a certain time of night or before a certain time in the morning, etc.). As another example, certain message recipients may prefer to be reached via e-mail instead of by phone. As yet a further example, certain message recipient may be more responsive when messaged over certain communication channels or at certain times.

Message sources may also have policies and preferences with respect to the providing of messages to the message recipients. For example, some message sources may prefer to identify the best prospective customers for their products and, further, how to communicate with those customers effectively. One-to-one communication to customers may be better for customer relationship management, but may be more expensive than a one-to-many communication that may be adequate for creating product familiarity. As another example, some message sources may prefer a two-way communication channel (e.g., SMS, phone), while other message sources may prefer a one-way communication channel (e.g., radio). Two-way communication channels may be preferred in instances where the message source would like to receive confirmation that the recipient received or read the message, or would like to be able to receive information in response to the message.

The determination of optimal communication channels by the communication policy server may be based on message sender preferences, message recipient preferences, messaging usage history maintained by the communication policy server, in combination with other situational factors, such as date and/or time of day, an estimated workload of the message recipient, number of vehicle occupants, and message content. By accounting for these preferences and other information, the communication policy server and communication manager may be utilized to improve communications over the various communication channels to the message recipient.

FIG. 1 illustrates an exemplary system 100 for providing communication channel 104 recommendations 142. The recommendations 142 may be provided regarding a message recipient, by way of a communication policy server 140 in communication with one or more communication managers 120. The system 100 may include a VCS 102 included in a vehicle, where the vehicle is able to transport one or more vehicle occupants. The VCS 102 may include a human-machine interface (HMI) 110, a vehicle network interface 112, and one or more processors 114 and memories 116. The memory 116 of the VCS 102 may store applications such as a media player 118, the communication manager 120 and a VCS device interface 134. The system may also include a mobile device 122 connected to a communications network 126 and including a processor 114 that executes instructions stored on a memory 116, such as those of a communication channel application 130 (e.g., an Internet radio application, an instant messaging application, etc.) in communication with a communication channel server 128, and those of a VCS device client 132 in communication with the VCS device interface 134. In some cases, the system 100 may also include a vehicle messaging server 136 configured to facilitate the providing of messages 106 to the VCS 102 in the form of a vehicle communication channel 104. The system 100 may also include a communication policy server 140 in communication with the communication manager 120 over the communications network 126 and configured to receive usage data from the VCS 102 and provide communication channel recommendations 142 to message sources 138. The system 100 may take many different forms and includes multiple and/or alternate components and facilities. While an exemplary system 100 is shown in FIG. 1, the exemplary components illustrated of the system 100 are not intended to be limiting. Indeed, additional or alternative components and/or implementations may be used.

The VCS 102 may be configured to provide computing services to the occupants of the vehicle, such as messaging over communication channels 104, vehicle health reports, turn-by-turn directions, searches for local businesses, hands-free calling and work load estimation, as some examples. An exemplary VCS 102 may be the SYNC® system manufactured by The Ford Motor Company of Dearborn, Mich.

The communication channels 104 provided by the VCS 102 may include any communications pathways through which messages 106 may be received and presented to the vehicle occupants. Exemplary communication channels 104 of the VCS 102 may include broadcast radio, Internet radio, in-band on-channel (IBOC) hybrid digital radio, video feeds, messaging services such as SMS, MMS, or instant messaging, telephone calls, e-mail messaging and communications targeted to the vehicle itself as a vehicle-based communication channel 104. Different communication channels 104 of the VCS 102 may have different capabilities. For example, different channels 104 may have different usage costs, different qualities of service, may support one-way or two-way messaging, and may use different encoding/decoding to provide messages 106. As an example, a radio communication channel 104 may be more expensive to use than text messaging to send a single message 106, but may reach a greater number of message recipients that are within the broadcast area.

In some cases, the VCS 102 may reply or otherwise respond to a received message 106 with a response 108. The response 108 may be a message 106 provided from the message recipient back to the message source. In many but not all cases, the response 108 may be provided over the communication channel 104 over which the message 106 was received. A vehicle occupant of the VCS 102 may direct the VCS 102 to provide a response 108 to the received message 106. As another example, the VCS 102 may be preconfigured to automatically provide predefined responses 108 to messages 106 of certain types, such as receipt acknowledgements.

As another aspect, the VCS 102 may be configured to address situations in which a message 106 may be provided to a communication channel 104 that is not recommended. For example, the VCS 102 may be configured to recommend a best communication channel 104 to a message source in response to receiving such a message 106, and may ask the message source to resend the message 106 over the preferred communication channel 104. As another example, the VCS 102 may be configured to switch the communication channel 104 of a received message 106 to appear to have been provided via a preferred communication channel 104 (e.g., transcribe a received voice message 106 into a text message, for instance, or the reverse). As yet a further example, the VCS may be configured to deliver the message 106 through the communication channel 104 to which it was received, regardless of whether that communication channel 104 is preferred.

The VCS 102 may include various human-machine interface (HMI) 110 elements configured to provide for occupant interaction with the VCS 102. As some non-limiting examples, the VCS 102 may include one or more of: a microphone to receive sound input from vehicle occupants; an auxiliary jack and associated audio circuitry to receive audio input from audio devices; one or more speakers to provide audio output; an instrument panel having one or more controls or displays; a visual or touch screen display to provide visual output or in some cases touch input; a haptic feedback mechanism; a USB® subsystem to send and receive data input from storage devices such as flash memory drives; a location subsystem (e.g., utilizing GPS or cell tower triangulation, as some examples) to send and receive location, destination, and heading information; a Bluetooth® input system configured to facilitate device pairing and data transfer between the VCS 102 and Bluetooth®-enabled devices; a speech recognition system to understand spoken sound input; a steering wheel or other auxiliary controls to receive driver input; and a camera or other image capture functionality to provide visual input to the vehicle. Messages may be provided to occupants of the vehicle by way of the HMI 110 of the VCS 102.

The VCS 102 may further include a vehicle network interface 112 in communication with other components of the vehicle by way of use of a vehicle network, such as via a vehicle controller area network (CAN). For instance, the vehicle network interface 112 may allow the VCS 102 to communicate with a workload estimator module configured to provide information with respect to the status of the occupant, such as situational driving demands, level of driver drowsiness/emotional state, or apparent correctness of driver inputs responsive to the driving situation. As further examples, the vehicle network interface 112 may be configured to facilitate communication with a restraint control module configured to provide sensed occupancy information for the vehicle (e.g., which seats have weight on them, which seatbelts are buckled, etc.) and/or an occupant classification module (e.g., of a passenger restraint system) configured to utilize seat or other sensors to provide information regarding the number of passengers in a vehicle as well as their sizes and weights.

The VCS 102 may include one or more processors 114 configured to execute application instructions stored on a memory 116 of the VCS 102, thereby allowing the VCS 102 to control the input and output components in support of the computing services. One such application may be a media player 118 configured to provide audio and video presentations of received messages 106 to the vehicle occupants in the HMI 110 of the VCS 102.

Another such application may be the communication manager 120. The communication manager 120 may be configured to detect the various communication channels 104 provided by the VCS 102 over which messages 106 may be received and presented to the vehicle occupants. In some cases, the communication manager 120 may be configured to identify which of the various communication channels 104 are being used and/or are presently available, or which of the communication channels 104 are registered for use (e.g., communications service applications installed on the VCS 102 or on mobile devices 122 that are paired with the VCS 102). The communication manager 120 may be further configured to compile and provide usage history 124 information with respect to the various communication channels 104 that had been used by the VCS 102. Exemplary usage history 124 information about the communication channels 104 may include frequency of channel 104 use, times of channel 104 use, and context in which the channels 104 are used (e.g., vehicle state, driver workload, etc.), as some examples.

The mobile device 122 may be any of various models of networked device, such as cellular phones, tablet computers, or other types of portable computing devices capable of executing applications and communicating over various networks, such as the communications network 126. The communications network 126 may provide communications services, such as packet-switched network services (e.g., Internet access, VoIP communication services), to devices connected to the communications network 126. An exemplary communications network 126 may include a cellular telephone network. To facilitate the communications over the communications network 126, mobile devices 122 may be associated with unique device identifiers (e.g., mobile device numbers (MDNs), Internet protocol (IP) addresses, etc.) to indicate, reference, or allow for the selective communication of the mobile devices 122 over the communications network 126.

In some cases, the VCS 102 may be configured to use a network transceiver (e.g., a Bluetooth® module) to communicate with a mobile device 122 of an occupant carried into the vehicle. Once connected, or paired, the mobile device 122 may then be used to allow the VCS 102 to communicate with the communications network 126. In one example, data can be passed through the mobile device 122 via a data-over-voice or data-plan of the mobile device 122, through the network transceiver of the VCS 102, and into the processor 114 of the VCS 102. As an additional aspect, occupants of the vehicle may be identified according to the unique device identifiers associated with the mobile devices 122 brought into and connected with the VCS 102 of the vehicle.

The mobile device 122 may also include one or more processors 114 configured to execute application instructions stored in a memory 116 of the mobile device 122. For instance, the mobile device 122 may be configured to execute a third-party communication channel application 130 in selective communication with a communication channel server 128 over the communications network 126. As another example, the mobile device 122 may be configured to execute a VCS device client 132 application configured to interface with the functionality of the VCS 102 by way of an associated VCS device interface 134 executed by the VCS 102. An exemplary VCS device interface 134 may be the SYNC® AppLink component of the SYNC® system. Through use of the VCS device client 132 application and communication channel application 130, the mobile device 122 may be configured to provide one or more additional communication channels 104 for use by the VCS 102.

The vehicle messaging server 136 may perform as another communication channel 104 for use by the VCS 102. The vehicle messaging server 136 may be in communication with the VCS 102 over the communication network 126, and may be configured to selectively provide messages 106 targeted to the VCS 102. To do so, the vehicle messaging server 136 may include or otherwise have access to information indicative of associations between message recipients and identifiers of vehicles. As one example, the vehicle messaging server 136 may utilize a mapping of vehicle identifier numbers (VINs) to identifiers of vehicle occupant names. Exemplary sources for the mapping information may include vehicle loan records from a server storing vehicle loan information, or a database of vehicle registrations, as some examples. By way of the vehicle messaging server 136, messages 106 may accordingly be provided to specific vehicles without requiring use of the other communication channels 104 of the message recipients (e.g., as opposed to sending a vehicle recipient an SMS message).

The message source 138 may be configured to provide messages 106 to one or more VCS 102 over one or more of the communication channels 104 of the system 100. As some examples, the message source 138 may be configured to send a message 106 to a VCS 102 by way of the communication channel server 128 and communication channel application 130, the vehicle messaging server 136, or SMS/MMS/telephone/email functionality of the mobile device 122. In some examples, the message source 138 may be commercial, such as a marketing service for targeted advertisements for products or services. In other examples, the message source 138 may be personal, such as a message 106 from a user's mobile device 122 or from a VCS 102 of a different vehicle.

The communication policy server 140 may be configured to provide channel recommendations 142 to message sources 138. The channel recommendations 142 may be sent to a message source 138 responsive to a request for recommendations 144 from the message source 138 for a preferred communication channel 104, and may include an indication of the preferred communication channel 104. The channel recommendations 142 may be determined by a policy server application 146 stored on a memory 116 of the communication policy server 140 and executed by a processor 114 of the communication policy server 140.

The policy server application 146 may be configured to determine the preferred communication channel 104 to specify in the channel recommendations 142 based at least in part on usage history 124 information. The policy server application 146 may identify, from the usage history 124, which communication channels 104 appear to be the most likely to receive a response 108 from the vehicle occupant(s) or be most likely used by the occupant when a message 106 is sent. The usage history 124 information may be received by the communication policy server 140 from the communication managers 120 of the VCS 102. The policy server application 146 may be further configured to determine the preferred communication channel recipient preferences 148 of the destination VCS 102 and sender preferences 150 of the originating message source 138. The communication policy server 140 may be further configured to consider other situational factors, such as recipient workload as received from the communication manager 120 of the VCS 102 from a workload estimator module of the vehicle, number of occupants of the vehicle as received from the VCS 102 from a restraint control module configured to provide sensed occupancy information, the current day and/or time of day, the content of the message 106, etc.

The recipient preferences 148 may include preferences with respect to what communication channels 104 the message recipient (e.g., VCS 102) may prefer. As an example, the recipient preferences 148 may include time periods during which one or more communication channels 104 of the recipient either should or should not be used (e.g., some message recipients may prefer not to be messaged during certain time periods, such as after a certain time of night or before a certain time in the morning). As another example, the recipient preferences 148 may include indications of which communication channels 104 should or should not be used (e.g., certain message recipients may prefer to be reached via e-mail instead of by phone, if possible).

The sender preferences 150 may include preferences with respect to what communication channels 104 the message source 138 may prefer to identify the best prospective customers for their products and, further, how to communicate with those customers effectively. As an example, marketers may prefer one-to-one communication channels 104 for message recipients for which they may wish to maintain an existing customer relationship, although one-to-one communications may be more expensive than one-to-many communications that may be adequate for creating product familiarity. As another example, marketers may prefer a two-way communication channel 104 (e.g., SMS, phone) for certain messages 106 (e.g., to receive a reply or other result from the message recipient), while in other cases the marketer may prefer a one-way communication channel 104 (e.g., radio).

The policy server application 146 may be further configured to determine what communication channels 104, collectively, to use to target multiple message recipients. For example, based on selection of a message 106 to send to multiple VCS 102 message recipients, the policy server application 146 may be configured to compute a graph of potential communication channels 104 for each target customer, generate a combined set of communication channels 104 to provide the message 106 to the multiple VCS 102 recipients, and remove redundant communication channels 104 to produce an optimal customer/channel pairing. For instance, it may not make sense to provide a message 106 as a radio advertisement for a limited pool of recipients, but may make more sense to do so for a larger group of message recipients. Thus, for messages 106 destined to reach multiple recipients, the policy server application 146 may be configured to determine communication channels 104 that are optimal as a group, e.g., optimal for the group of recipients as a whole given messaging budget and timing constraints, not merely for individual message recipients.

Figure 2:
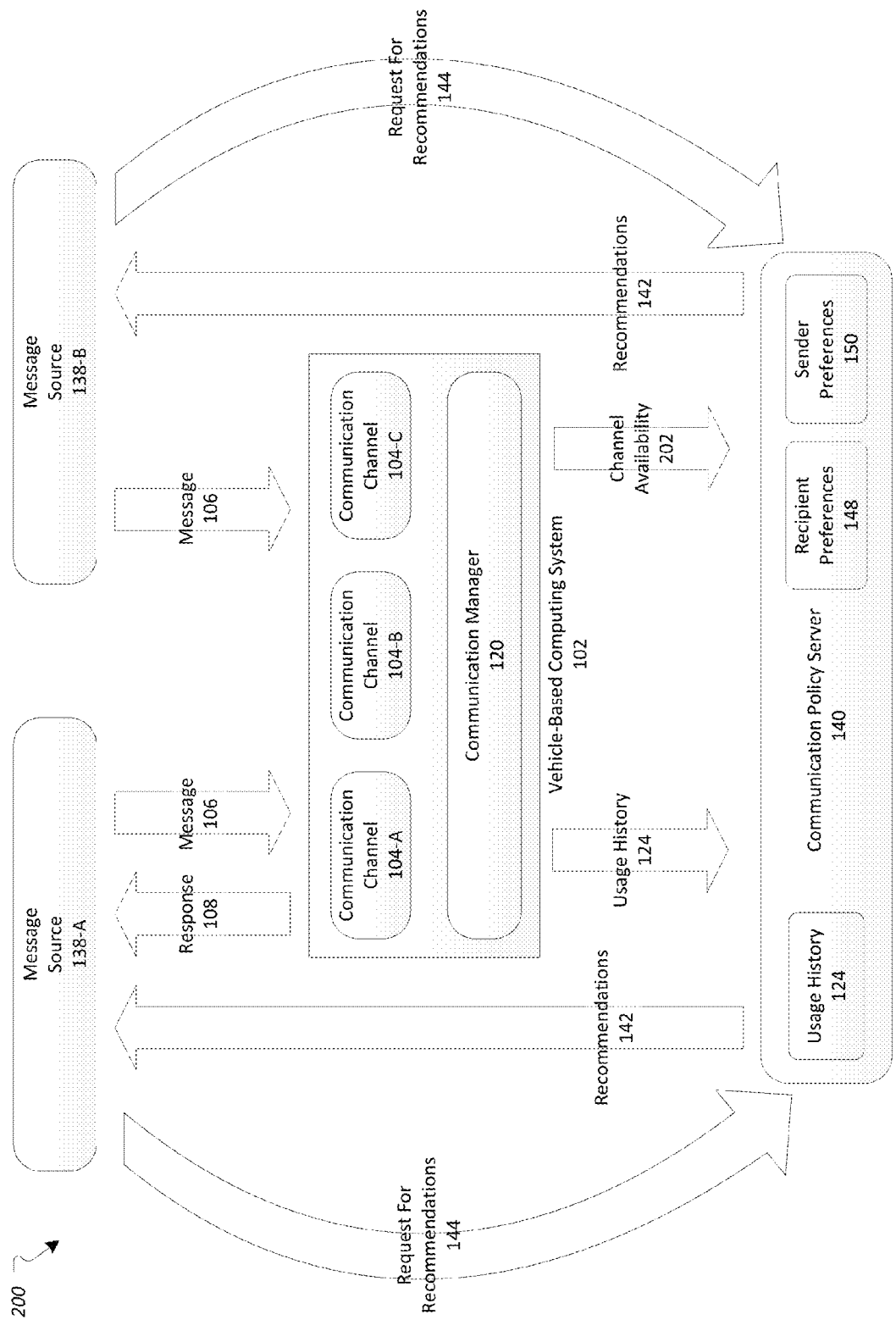
FIG. 2 illustrates an exemplary data flow for providing communication channel recommendations to message sources.

FIG. 2 illustrates an exemplary data flow 200 for the providing of communication channel recommendations 142 to message sources 138. As shown, the data flow 200 includes message sources 138-A and 138-B, each sending requests for recommendations 144 to a communication policy server 140, and receiving, in response, a recommendation 142 of one of a plurality of communication channels 104 of the VCS 102 over which to provide messages 106 to the VCS 102. Upon receiving the recommendations 142, the message sources 138 may be configured to send the messages 106 to the VCS 102 over the recommended communication channels 104.

Each of the communication channels 104-A through 104-C may be associated with a service application (e.g., a communication channel application 130, communication manager 120 functionality for communication with the vehicle messaging server 136, etc.) capable of delivering messages 106, providing responses 108, and in some cases, providing the capabilities and availability of the application for reaching customers. Thus, the communication manager 120 may be configured to discover the communication channels 104 that are available for use by enumerating or otherwise discovering the service applications that may be available. As one example, the communication manager 120 may send a broadcast query message over the VCS device interface 134 to request communication channels 104 of connected mobile devices 122 to identify themselves (e.g., one connected mobile device 122 is shown in FIG. 1). As another example, the communication manager 120 may query a listing of applications installed on the VCS 102 itself to identify any applications providing communication channels 104 to the vehicle occupants. Thus, the communication channels 104 may be made available by applications of connected mobile devices 122 and/or by applications installed to the VCS 102 itself. An exemplary set of communication channels 104 may include a phone communication channel 104-A, an e-mail communication channel 104-B, and a text message communication channel 104-C (e.g., SMS, instant message), as one possibility.

The communication manager 120 may be configured to provide updated channel availability 202 regarding the identified set of communication channels 104 to the communication policy server 140 to aid in its determination of which communication channels 104 to provide in the recommendations 142 to the message sources 138. The communication manager 120 may also be configured to provide other additional situational information to the communication policy server 140 (either as part of the channel availability 202 or via separate messages), such as information related to the number of passengers of the vehicle, the average driver workload as determined by a workload estimator module of the vehicle, etc.

In some cases, the VCS 102 may respond to the received messages 106. As shown, the VCS 102 may send a response 108 to the message 106 sent by the message source 138-A, but not to the message 106 sent to the VCS 102 by the message source 138-B. Usage history 124 regarding the responses 108 of the VCS 102 may be provided to the communication policy server 140 to facilitate the generation of further refined recommendations 142 to the message sources 138 (such as the message sources 138-A and 138-B).

Figure 3:
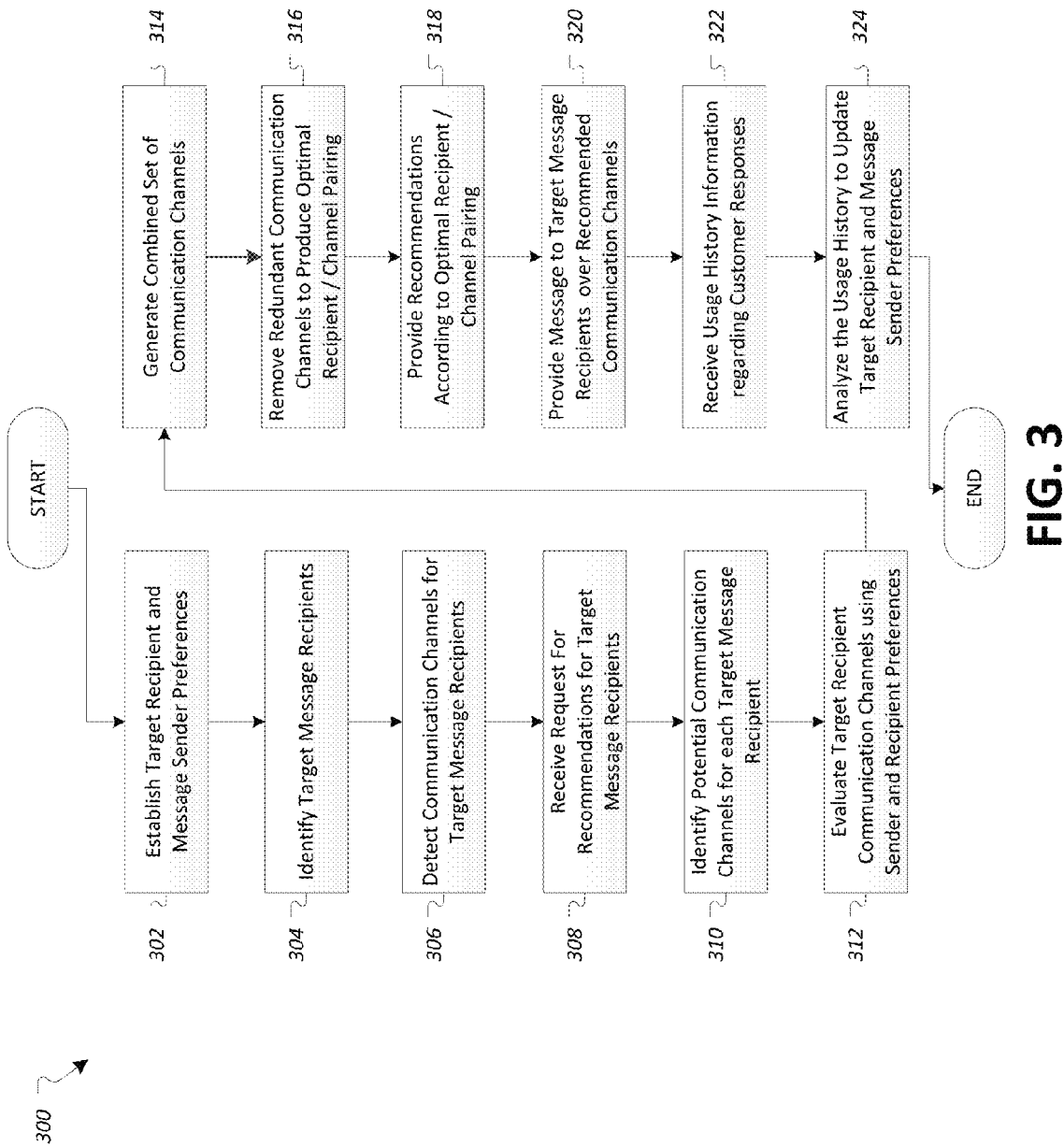
FIG. 3 illustrates an exemplary process for providing communications from message sources based on communication channel recommendations.

FIG. 3 illustrates an exemplary process 300 for the providing of communications from message sources 138 based on communication channel 104 recommendations 142. In some cases, the process 300 may be performed by elements of the system 100, such as by one or more message sources 138 and a communication manager 120 of a VCS 102 in communication with a policy server application 146 of a communication policy server 140.

In block 302, the system 100 establishes recipient preferences 148 for the target VCS 102 recipients and sender preferences 150 for the message source 138. For example, the communication policy server 140 may identify demographic or other information about the VCS 102, and may utilize that information to categorize the VCS 102. Based on the categorization, the communication policy server 140 may be configured to estimate the recipient preferences 148 according to those preferences of the group or groups in which the VCS 102 may be classified. As another example, message recipients may provide recipient preferences 148 to the communication policy server 140 for use in the determination of optimal communication channels 104 to use to reach the vehicle occupants.

In block 304, the system 100 identifies target message recipients. For example, the communication policy server 140 may be configured to rank the VCS 102 or the vehicle occupants of the VCS 102 according to probability of responding to marketing messages from message sources 138, and a message source 138 may utilize the ranking information to target a message at recipients most likely to respond. As another example, the message source 138 may utilize demographic information about the purchaser of the vehicle containing the VCS 102 to identify which VCS 102 recipients may be applicable to a particular marketing campaign. As yet a further example, a message source 138 may target certain recipients specifically, e.g., by e-mail address, phone number, VIN, etc.

In block 306, the system 100 detects communication channels 104 of the target message recipients. For example, communication managers 120 of one or more of the target message recipients may be configured to discover the communication channels 104 that are available for use by the associated VCS 102 recipients by enumerating or otherwise discovering the service applications available to the VCS 102 or to mobile devices 122 connected to the VCS 102. The communication managers 120 may provide the channel availability 202 information relating to the set of discovered communication channels 104 to the communication policy server 140.

In block 308, the system 100 receives an indication of a message 106 to be provided to one or more VCS 102 message recipients. As an example, a message source 138 may send a request for recommendations 144 to the communication policy server 140 based on selecting a message 106 to be provided to one or more VCS 102 message recipients. The communication policy server 140 may accordingly receive the request for recommendations 144 from the message source 138 desiring to send a message 106 to one or more VCS 102 recipients. The communication policy server 140 may provide the information to the policy server application 146 for processing. In some cases, the request for recommendations 144 may be provided to the communication policy server 140 via the communications network 126, while in other cases, the request for recommendations 144 may be provided to the policy server application 146 via the communication manager 120 of the targeted VCS 102 recipients.

In block 310, the system 100 identifies potential communication channels 104 to reach the target VCS 102 recipients. For example, the policy server application 146 may determine potential communication channels 104 for each target VCS 102 based on the channel availability 202 information received from the communication manager 120 of the target VCS 102 recipients.

In block 312, the system 100 evaluates the target VCS 102 communication channels 104 according to the recipient preferences 148 and sender preferences 150. For example, the policy server application 146 may utilize the recipient preferences 148 to determine which of the potential communication channels 104 for each target VCS 102 are preferred for use in providing messages 106 to the VCS 102 recipients. In some cases, the determination of potential communication channels 104 may include only one possible communication channel 104, but in other cases, the determination of potential communication channel 104 may result in multiple potential communication channels 104 being available. In cases in which the determination of potential communication channels 104 includes multiple communication channels 104, the policy server application 146 may be configured to utilize the recipient preferences 148 to rank the communication channels 104 as more or less preferred for use in sending the message 106.

In block 314, the system 100 generates a combined set of communication channels 104. For example, in cases in which a message 106 is targeted to multiple VCS 102 recipients, the policy server application 146 may be configured to combine the potential communication channels 104 for each of the multiple VCS 102 recipients into a single, overall listing of target VCS 102 recipient/communication channels 104 pairs that may be used to send the message 106 to the VCS 102 recipients.

In block 316, the system 100 removes redundant communication channels 104 to produce an optimal VCS 102/communication channel 104 pairing. For instance, the policy server application 146 may be configured to cluster the VCS 102/communication channel 104 pairs and remove redundant communication channel 104 to produce an optimal pairing of groups of VCS 102 recipients and the communication channel 104 to them. As an example, if the policy server application 146 identifies a sufficient number of target VCS 102 recipients clustered to use a broadcast communication channel 104, then the policy server application 146 may identify that broadcast communication channel 104 as optimal for those target VCS 102 recipients, and may remove the other VCS 102/communication channel 104 pairs from the pairing for those target VCS 102 recipients. As another example, if, according to the recipient preferences 148 certain target VCS 102 recipients prefer use of an e-mail communication channel 104 during certain hours, then the policy server application 146 may identify that e-mail communication channel 104 as optimal for those target VCS 102 recipients, and may remove the other VCS 102/communication channel 104 pairs from the pairing for those target VCS 102 recipients. As yet a further example, if the sender preferences 150 of the message source 138 indicate that telephone communication is preferred, then for those target VCS 102 recipients that have a telephone communication channel 104 available in the VCS 102/communication channel 104 pairs, the telephone communication channel 104 may be indicated as optimal.

In block 318, the system 100 provides recommendations 142 to the message source 138. For example, the policy server application 146 may be configured to send the optimal VCS 102/communication channel 104 pairs to the message source 138 to use in providing the message 106 to the VCS 102 recipients.

In block 320, the system 100 provides the message 106 to the target VCS 102 recipients over the paired communication channels 104. For example, the message source 138 may provide the message 106 to the target VCS 102 recipients according to the optimal VCS 102/communication channel 104 pairs. In cases in which multiple VCS 102 recipients are targeted according to use of the same optimal communication channel 104, those messages 106 may be sent via the communication channel 104 concurrently. For instance, if multiple target VCS 102 recipients are targeted using an e-mail communication channel 104 or a broadcast radio communication channel 104, those messages 106 may be sent via single e-mail or radio broadcast time slot.

In block 322, the system 100 receives responses 108 from the VCS 102 recipients. For example, in some cases, the message sources 138 may use two-way communication channels 104 to provide the messages 106 to the VCS 102 recipients. In those cases, the VCS 102 may provide a response 108 to the message sources 138 over the communication channel 104. For instance, one or more VCS 102 recipients may send a response e-mail back to the message source 138 over an e-mail communication channel 104 over which a message 106 was received. Or, one or more VCS 102 recipients may respond by phone during a telephone communication over a phone communication channel 104. The communication manager 120 of the VCS 102 recipients that respond may compile usage history 124 based on the provided responses 108. Exemplary usage history 124 information about the communication channels 104 may include frequency of communication channel 104 use, times of communication channel 104 use, situational context in which the communication channels 104 are used (e.g., vehicle state, driver workload, etc.), as some examples.

In block 324, the system 100 analyzes the received customer responses 108 to update the recipient preferences 148 and/or sender preferences 150. For example, if certain VCS 102 recipients respond (or do not respond) to messages 106 sent via the communication channels 104, the sender preferences 150 may be updated to prefer (or to avoid) those communication channels 104 for those VCS 102 recipients in the future. Similarly, the recipient preferences 148 may be updated to prefer or avoid the communication channels 104 based on whether or not the VCS 102 recipient responded or did not respond to the message 106. These updates may, accordingly, allow the system 100 to better learn which communication channels 104 to recommend in the future. After block 324, the process 300 ends.

Thus, based on the usage history 124 collected, the communication policy server 140 may be configured to use machine learning methods to learn the communication preferences and policies of the vehicle occupants of the VCS 102.

These techniques may be useful in providing targeted messages 106 to vehicle occupants by way of the VCS 102. As one example, the communication policy server 140 may be configured to segment or cluster the vehicle occupants by their demographic information, such as income, age and type of vehicles they purchase. Within each group, the communication policy server 140 may be further configured to rank the vehicle occupants according to probability of responding to marketing messages 106 from the message sources 138. The communication policy server 140 may be further configured to utilize the available usage history 124 information or other available information about those vehicle occupants to evaluate what type of messages 106 those users received in the past, if, when, how, and how often the users responded to the messages 106, as well as demographic information and locations with respect to the vehicle occupants, time of vehicle occupant response, location of vehicle occupant when responding, and interests or needs of the vehicle occupant, as some exemplary considerations.

The communication policy server 140 may, accordingly, be configured to rank the communication channels 104 in order of their probability to reach the vehicle occupants having certain demographic or other characteristics. Once the vehicle occupants have been assigned to clusters, messages 106 that fit profiles relating to the assigned cluster may be delivered via communication channels 104 determined to be optimal for those vehicle occupants. For example, a vehicle occupant classified as a millennial may prefer social group communication channel 104 or an application communication channel 104 over a radio communication channel 104. Once the messages have been delivered, the vehicle occupants' responses 108 may be collected by the communication manager 120 of the vehicle. The communication policy server 140 may process the received responses 108, and may update the recipient preferences 148 for the vehicle occupants having the certain demographic or other characteristics. Based on the updating of recipient preferences 148 and sender preferences 150, the system 100 may aid in the delivery of messages 106 via the proper communication channels 104.

As another application, the communication policy server 140 may be configured to determine the performance of available communication channels 104 used in advertising campaigns. For instance, the communication policy server 140 may be configured to track messages 106 that are sent to users over communication channels 104 (e.g., according to read-receipt of e-mail messages 106, by acknowledgement by the VCS 102, etc.), and compare purchase data for those users to those of users who did not receive the messages 106 of the advertising campaign. For example, the communication policy server 140 may be configured to perform a merge of sent message 106 data with information related to users that purchased the goods or services of the advertising campaign. The measure of purchases for users who received the messages 106 of the advertising campaign over those who did not may be referred to as lift. Statistics regarding delivery of the messages 106 over the communication channels 104 may therefore be compiled by the communication policy server 104 that may be used to compare the effectiveness of messages 106 over the various communication channels 104 based on one or more of response rate to the messages or lift, metrics that may be important to marketers running advertising campaigns. The communication policy server 140 may further utilize the statistics to update sender preferences 150 to achieve better results for future advertising campaigns.

In general, computing systems and/or devices, such as the mobile devices 122, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the mobile devices 122 generally include computer-executable instructions such as the instructions of the communication channel application 130, where the instructions may be executable by one or more processors 114. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 114 or microprocessor 114 receives instructions, e.g., from a memory 116, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor 114 of a computing device). Such a medium may take many forms, including, but not limited to, non-volatile media and volatile media. Non-volatile media may include, for example, optical or magnetic disks and other persistent memory 116. Volatile media may include, for example, dynamic random access memory 116 (DRAM), which typically constitutes a main memory 116. Such instructions may be transmitted by one or more transmission media, including coaxial cables, copper wire and fiber optics, including the wires that comprise a system bus coupled to a processor 114 of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory 116 chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer-readable media associated therewith (e.g., disks, memories 116, etc.). A computer program product may comprise such instructions stored on computer-readable media for carrying out the functions described herein. The communication channel application 130 may be one such computer program product. In some examples, the communication channel application 130 may be provided as software that, when executed by the processor 114, provides the operations described herein. Alternatively, the communication channel application 130 may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method, comprising:
    receiving, by a communication policy server, channel availability information indicative of a plurality of communication channels detected by a communication manager within a vehicle, each of the plurality of communication channels configured to provide messages to a target recipient within the vehicle; and
    recommending, by the communication policy server, one of the plurality of detected communication channels as optimal based on preferences of the target recipient and message source.

2. The method of claim 1, further comprising
    recommending the one of the plurality of detected communication channels additionally based on situational factors including at least one of: date, time of day, driver workload, or number of vehicle occupants.

3. The method of claim 1, further comprising:
    receiving usage history information from the communication manager of the vehicle; and
    analyzing the usage history to update at least one of the preferences of the target recipient or the preferences of the message source.

4. The method of claim 1, further comprising:
    receiving, by a communication policy server, second channel availability information indicative of a second plurality of communication channels detected by a communication manager of a second vehicle;

generating a combined set of recipient channel pairs based on the channel availability information and the second channel availability information; and recommending, by the communication policy server, one of the second plurality of detected communication channels as optimal based on preferences of a second target recipient and message source.

5. The method of claim 1, wherein the plurality of communication channels includes at least two of: a broadcast radio communication channel, an Internet radio communication channel, an in-band on-channel communication channel, a video feed communication channel, a messaging service communication channel, a telephone communication channel, an e-mail messaging communication channel, a social networking communication channel, a billboard communication channel or a vehicle-based communication channel.

6. The method of claim 1, wherein the preferences of the target recipient include at least one of: (i) a time period during which one or more of the plurality of communication channels is preferred, (ii) a time period during which one or more of the plurality of communication channels is not preferred, (iii) an indication of a type of communication channels preferred by the target recipient, (iv) an indication of a type of communication channels not preferred by the target recipient, or (v) an indication of a level of workload above which a type of communication channels is preferred over another type of communication channels.

7. The method of claim 1, wherein the preferences of the message source include at least one of: (i) a preference for one-way communication channels, (ii) a preference for two-way communication channels, (iii) an indication of a type of communication channels preferred by a message source, (iv) an indication of a type of communication channels not preferred by the message source, (v) a time period during which one or more of the plurality of communication channels is preferred by a message source, or (vi) a time period during which one or more of the plurality of communication channels is not preferred by a message source.

8. The method of claim 6, wherein the preferences of the message source are based on at least one of message content or message type.

9. A system comprising:

a communication policy server programmed to receive channel availability information indicative of a plurality of communication channels detected by a communication manager within a vehicle, each of the plurality of communication channels configured to provide messages to a target recipient within the vehicle; and recommend one of the plurality of detected communication channels as optimal based on preferences of the target recipient and message source.

10. The system of claim 9, the communication policy server further programmed to:

receive usage history information from the communication manager of the vehicle; and analyze the usage history information to update at least one of the preferences of the target recipient or the preferences of the message source.

11. The system of claim 9, the communication policy server further programmed to:

receive, by a communication policy server, second channel availability information indicative of a second plurality of communication channels detected by a communication manager of a second vehicle;

generate a combined set of recipient channel pairs based on the channel availability information and the second channel availability information; and recommend, by the communication policy server, one of the second plurality of detected communication channels as optimal based on preferences of a second target recipient and message source.

12. The system of claim 9, wherein the plurality of communication channels includes at least two of: a broadcast radio communication channel, an Internet radio communication channel, an in-band on-channel communication channel, a video feed communication channel, a messaging service communication channel, a telephone communication channel, an e-mail messaging communication channel, a social networking communication channel, a billboard communication channel or a vehicle-based communication channel.

13. The system of claim 9, wherein the preferences of the target recipient preferences include at least one of: (i) a time period during which one or more of the plurality of communication channels is preferred, (ii) a time period during which one or more of the plurality of communication channels is not preferred, (iii) an indication of a type of communication channels preferred by the target recipient, (iv) an indication of a type of communication channels not preferred by the target recipient, or (v) an indication of a level of workload above which a type of communication channels is preferred over another type of communication channels.

14. The system of claim 9, wherein the preferences of the message source include at least one of: (i) a preference for one-way communication channels, (ii) a preference for two-way communication channels, (iii) an indication of a type of communication channels preferred by a message source, (iv) an indication of a type of communication channels not preferred by the message source, (v) a time period during which one or more of the plurality of communication channels is preferred by a message source, or (vi) a time period during which one or more of the plurality of communication channels is not preferred by a message source.

15. The system of claim 9, the communication policy server further programmed to:

determine effectiveness of messages over at least a subset of the plurality of communication channels according to at least one of response rate and lift; and update the preferences of the message source to prefer communication channels based on the determined effectiveness.

16. A non-transitory computer-readable medium storing a policy server application software program, the policy server application being executable by a processor to provide operations comprising:

receiving channel availability information indicative of a plurality of communication channels detected by a communication manager within a vehicle, each of the plurality of communication channels configured to provide messages to a target recipient within the vehicle; and recommending one of the plurality of detected communication channels as optimal based on preferences of the target recipient and message source.

17. The non-transitory computer-readable medium of claim 16, further providing for operations comprising:

receiving usage history information from the communication manager of the vehicle; and analyzing the usage history information to update at least one of the preferences of the target recipient or the preferences of the message source.

18. The non-transitory computer-readable medium of claim 16, further providing for operations comprising:

receiving, by a communication policy server, second channel availability information indicative of a second plurality of communication channels detected by a communication manager of a second vehicle;

generating a combined set of recipient channel pairs based on the channel availability information and the second channel availability information; and recommending, by the communication policy server, one of the second plurality of detected communication channels as optimal based on preferences of a second target recipient and message source.

19. The non-transitory computer-readable medium of claim 16, wherein the plurality of communication channels includes at least two of: a broadcast radio communication channel, an Internet radio communication channel, an in-band on-channel communication channel, a video feed communication channel, a messaging service communication channel, a telephone communication channel, an e-mail messaging communication channel, a social networking communication channel, a billboard communication channel or a vehicle-based communication channel.

20. The non-transitory computer-readable medium of claim 16, wherein the preferences of the target recipient include at least one of: (i) a time period during which one or more of the plurality of communication channels is preferred, (ii) a time period during which one or more of the plurality of communication channels is not preferred, (iii) an indication of a type of communication channels preferred by the target recipient, (iv) an indication of a type of communication channels not preferred by the target recipient, or (v) an indication of a level of workload above which a type of communication channels is preferred over another type of communication channels.

21. The non-transitory computer-readable medium of claim 16, wherein the preferences of the message source include at least one of: (i) a preference for one-way communication channels, (ii) a preference for two-way communication channels, (iii) an indication of a type of communication channels preferred by a message source, (iv) an indication of a type of communication channels not preferred by the message source, (v) a time period during which one or more of the plurality of communication channels is preferred by a message source, or (vi) a time period during which one or more of the plurality of communication channels is not preferred by a message source.

22. The non-transitory computer-readable medium of claim 21, further providing for operations comprising:

determining effectiveness of messages over at least a subset of the plurality of communication channels according to at least one of response rate and lift; and updating the preferences of the message source to prefer communication channels based on the determined effectiveness.

* * * * *